(12) United States Patent
Junkergard et al.

(10) Patent No.: US 9,390,159 B2
(45) Date of Patent: Jul. 12, 2016

(54) DATABASE ARCHITECTURE FOR STORING MULTI-STRUCTURED DATA

(71) Applicant: Zephyr Health, Inc., San Francisco, CA (US)

(72) Inventors: Sven Christoffer Junkergard, San Anselmo, CA (US); Brian Thomas Roy, Orinda, CA (US)

(73) Assignee: ZEPHYR HEALTH, INC., San Francisco, CA (US)

( * ) Notice: Subject to any disclaimer, the term of this patent is extended or adjusted under 35 U.S.C. 154(b) by 198 days.

(21) Appl. No.: 14/203,160

(22) Filed: Mar. 10, 2014

(65) Prior Publication Data

US 2015/0254289 A1    Sep. 10, 2015

(51) Int. Cl.
*G06F 17/00*    (2006.01)
*G06F 17/30*    (2006.01)

(52) U.S. Cl.
CPC ............... *G06F 17/30592* (2013.01)

(58) Field of Classification Search
CPC ........... G06F 9/46; G06F 9/5038; G06F 9/54; G06F 17/30734; G06F 17/30294; G06F 17/30297
See application file for complete search history.

(56) References Cited

U.S. PATENT DOCUMENTS

2010/0312779 A1* 12/2010 Lim .................... G06F 17/3064
                                                                    707/759

* cited by examiner

*Primary Examiner* — Truong Vo
(74) *Attorney, Agent, or Firm* — K&L Gates LLP

(57) ABSTRACT

In various embodiments, a system for ingesting, organizing, and storing data is disclosed. The system comprises a processor and a memory unit. A document database is stored by the memory unit. The document database is configured to store data without any foreknowledge of a structure of the data. The data comprises an ontology comprising a plurality of terms describing the data within the document database. A graph database is stored by the memory unit. The graph database comprises a materialized view of the document database. The graph database provides connections between the ontology. The document database and the graph database share common entity profile UUIDs.

20 Claims, 8 Drawing Sheets

DATABASE ARCHITECTURE FOR STORING MULTI-STRUCTURED DATA

BACKGROUND

As enterprises collect larger and larger volumes of data about their target markets, customer and community structured data (e.g., customer relationship management (CRM) data and enterprise resource planning (ERP) data) is becoming an increasingly smaller percentage of the overall data domain. At the same time the need to interconnect the data and use it to produce analytics and data driven business decisions has grown.

A single persistence solution to data management requires significant tradeoffs and creates complexity in the management of data and abstraction of components required to manage and search the data effectively. A single database may be well suited to storing data, and managing relationships between the data, but may not be suitable to both purposes simultaneously. Relational databases excel at managing relationships between aggregated data. However, when attempting to manage relations between disaggregated data, relational models require creating a predetermined hierarchy which may be brittle and exceptionally difficult to manage.

What is needed is a flexible persistence solution for providing data management of amorphous data without a fixed hierarchical relationship while maintaining robust searching and indexing functionality.

SUMMARY

In various embodiments, a data management system for ingesting, organizing, and storing data is disclosed. The data management system comprises a processor and a memory unit. A document database is stored by the memory unit. The document database is configured to store data without any foreknowledge of a structure of the data. The data comprises an ontology comprising a plurality of terms describing the data within the document database. A graph database is stored by the memory unit. The graph database comprises a materialized view of the document database. The graph database provides connections between the ontology. The document database and the graph database share common entity profile UUIDs.

In various embodiments, a computer-implemented method for ingesting, organizing, and accessing data is disclosed. The method comprises storing, by a memory unit, a document database. The document database is configured to store data without any foreknowledge of a structure of the data. The data comprises an ontology comprising a plurality of terms describing the data. The method further comprises storing, by the memory unit, a graph database. The graph database comprises a materialized view of the document database. The graph database provides connections between the plurality of terms. The document database and the graph database share common entity profile UUIDs. The method further comprises accessing, by the processor, data in the document database through the connections of the graph database.

In various embodiments, a non-transitory computer-readable medium comprising a plurality of instructions which may be executed by a computer processor is disclosed. The plurality of instructions causes the processor to store a document database in a memory unit. The document database is configured to store data without any foreknowledge of a structure of the data. The data comprises an ontology comprising a plurality of terms describing the data. The plurality of instructions further causes the processor to store a graph database in the memory unit. The graph database comprises a materialized view of the document database. The graph database provides connections between the ontology. The document database and the graph database share common entity profile UUIDs.

DRAWINGS

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

In various embodiments, a data management system for ingesting, organizing, and storing data is disclosed. The data management system comprises a processor and a memory unit. A document database is stored by the memory unit. The document database is configured to store data without any foreknowledge of a structure of the data. The data comprises an ontology comprising a plurality of terms describing the data within the document database. A graph database is stored by the memory unit. The graph database comprises a materialized view of the document database. The graph database provides connections between the ontology. The document database and the graph database share common entity profile UUIDs.

In various embodiments, a computer-implemented method for ingesting, organizing, and accessing data is disclosed. The method comprises storing, by a memory unit, a document database. The document database is configured to store data without any foreknowledge of a structure of the data. The data comprises an ontology comprising a plurality of terms describing the data. The method further comprises storing, by the memory unit, a graph database. The graph database comprises a materialized view of the document database. The graph database provides connections between the plurality of terms. The document database and the graph database share common entity profile UUIDs. The method further comprises accessing, by the processor, data in the document database through the connections of the graph database.

In various embodiments, a non-transitory computer-readable medium comprising a plurality of instructions which may be executed by a computer processor is disclosed. The plurality of instructions causes the processor to store a document database in a memory unit. The document database is configured to store data without any foreknowledge of a structure of the data. The data comprises an ontology comprising a plurality of terms describing the data. The plurality of instructions further causes the processor to store a graph database in the memory unit. The graph database comprises a materialized view of the document database. The graph database provides connections between the ontology. The document database and the graph database share common entity profile UUIDs.

Reference will now be made in detail to several embodiments, including embodiments showing example implementations of data management systems and methods for ingesting, organizing, and accessing data. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
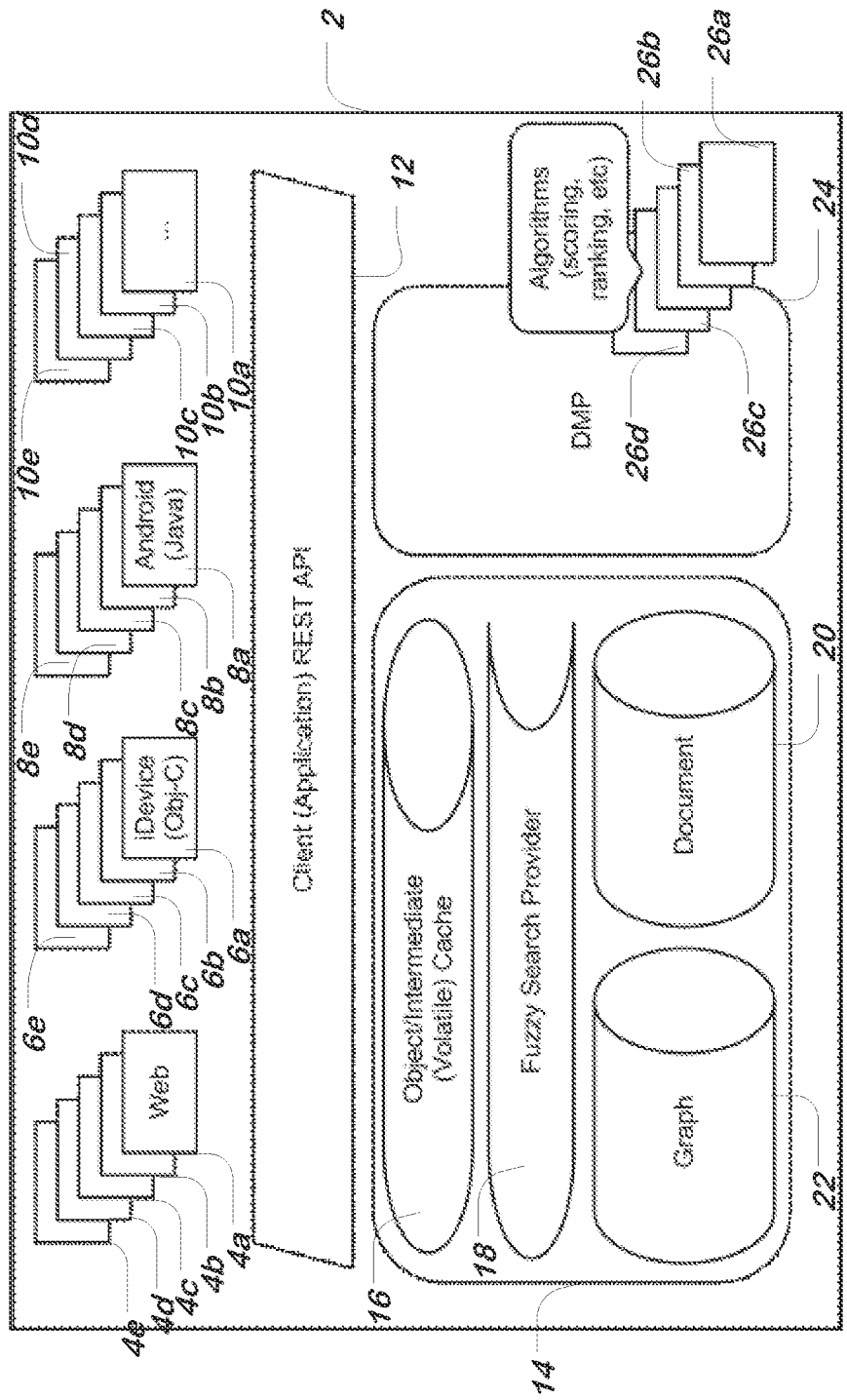
FIG. 1 illustrates one embodiment of a system for ingesting, organizing, and accessing data.

FIG. 1 illustrates a data management system 2 for indexing and querying multi-structured data, such as data from many different sources in many different formats. For example, data may be received or accessed from web applications 4a-4e, iOS applications 6a-6e which operate in the objective-C language, Android applications 8a-8e, which operate in the Java language, and any additional applications 10a-10e in any suitable computer language. In some embodiments, the data management system 2 may comprise a two-tier database architecture 14. The two-tiered database architecture 14 may comprise a document database 20 as the main storage mechanism and a graph database 22 for indexing and querying the underlying data of the document database 20. The two-tiered database architecture 14 allows the data management system 2 to manage a large amount of multi-structured and interconnected data. Management of large amounts of multi-structured and interconnected data may be difficult or impossible with traditional single tiered databases. The data management system 2 may enable ingestion, organization, and interconnecting of all of the data of an enterprise and may make that data available in a meaningful way. The ingestion, organization, interconnection and availability of unstructured, semi-structured and structured data allows for data visualization and analysis of the data to provide business insights to a user.

In one embodiment, the data management system 2 enables ingestion, organization and accessibility of unstructured, semi-structured and structured data in a Software-as-a-Service (SaaS) model. Ingestion of data may comprise receiving and storing data without any foreknowledge of the structure and content of that data. The data may be stored in a document database 20. In one embodiment, the data management system 2 stores the data in a schema-less document database 20 which allows for amorphous data models and does not require the data architecture to be known prior to storage. The document database 20 may store representations of entities, persons, or things within a domain. The representations stored in the document database 20 may comprise one or more documents. The document database 20 may comprise a data dense-index sparse database which allows the storing of bulk data without robust search capabilities. In one embodiment, the document database 20 may comprise, for example, a MongoDB database.

In one embodiment, the two-tiered database architecture 14 may comprise a graph database 22. The document database 20 allows the data management system 2 to provide amorphic data models and processing but lacks the ability to provide connectivity between the concepts (entities, structures, attributes) within the stored data. A graph database 22 may be implemented to provide connectivity between the concepts of the data stored within the document database 20. In one embodiment, the graph database 22 may comprise a materialized view of the document database 20. The graph database 22 may provide a data sparse-index-dense graph of the entire data domain. The graph database 22 allows connectivity of the data in the document database 20 to be expressed in a compact, high performance structure. In one embodiment, the graph database 22 may comprise, for example, a Neo4j database.

In some embodiments, the data management system 2 may comprise an application programming interface (API) 12 for providing access to the two-tiered database architecture 14. In one embodiment, the API 12 may comprise a representational state transfer API (REST API) via which the capabilities of two-tiered database architecture 14 are accessible. The API 12 may provide access to the document database 20 and graph database 22 without the need for a user to consider the persistence mechanism, e.g., the two-tiered architecture 14, the data is sourced from. In some embodiments, the API 12 may be highly expressive and may provide immediate access to new ontology constructs without any additional development. For example, in one embodiment, the API 12 may be configured to add user-defined terms to an ontology and provide search capabilities based on the updated ontology without the need for the user to interact with the ontological definitions of the document database 20.

In one embodiment, the data management system 2 may comprise three high level components: a core persistence component, a data management component, and a data accessibility component. The core persistence component may comprise the two-tiered document architecture 14. The core persistence component may comprise one or more ontologies for classifying data in various domains that may be associated with the document database 20. The document database 20 is configured to store bulk data in a data dense, index sparse structure. The graph database 22 comprises a materialized view of the document database 20. The graph database 22 comprises a data sparse, index dense structure. The two-tiered database architecture 14 may comprise an in memory cache for storing recently retrieved, commonly retrieved, or recently generated nodes or documents. In one embodiment, the graph database 22 may provide full text search of the data (e.g., documents) stored within the document database 20.

The data management component 24 may comprise data ingestion, organization, and management functions. In one embodiment, the data management component 24 may provide parsing, loading, modeling, and linking of incoming data. The data management component 24 may be linked to one or more external functions 26a-26d. In one embodiment, the external functions 26a-26d may comprise black box functions which are not visible by the user. The external functions 26a-26d may comprise one or more algorithms for processing, parsing, loading, modeling, or linking data incoming to the document database 20. The data management component 24 may provide data normalization and disambiguation, such as, for example, by linking the incoming data to the proper terms in the ontology vocabulary or eliminating redundant terms in the ontology vocabulary. The data management component 24 may manage linkages across the two-tiered architecture 14 and may create or eliminate linkages between nodes or terms. The data management component 24 may manage the ontology, such as, for example, by adding new vocabulary to the ontology, managing the hierarchical structure of the ontology, or updating the terms in the vocabulary.

The data accessibility component provides access to the graph database 22 and the document database 20 to a user. The data accessibility component may comprise an API 12. The API 12 obfuscates the implementation details by merging the core persistence model, e.g., by providing access to both the document database 20 and the graph database 22 in the same API. By implementing the API 12, developers need not be concerned with the underlying data architecture or implementation, and may focus on manipulation and analysis of the stored data. In one embodiment, API 12 may comprise an expressive, semantically complete, REST API. The API 12 may expose the vocabulary and taxonomy of the data domain. New data and data features, for example new vocabulary, are immediately available via the API 12 without additional development.

In one embodiment, the data stored in the document database 20 may comprise one or more ontologies which describe the data. An otology formally represents knowledge as a set of concepts and the relationships between pairs of concepts within a domain. Ontologies may be used to model a domain and support reasoning about entities or structures within the domain. An ontology may comprise a shared vocabulary which describes the various entities or structures within the domain. The shared vocabulary may comprise a plurality of terms defining the entities, concepts, or structures within the selected domain. For example, the plurality of terms may correspond to one or more attributes of the entities, concepts, or structures within the domain. The vocabulary may be used to model a domain with the definition of objects or concepts and related properties. In one embodiment, the ontology may describe a vertical structure within a domain. For example, in one embodiment, the data management system 2 may comprise an ontology describing concepts within a specific domain, such as, for example, a healthcare domain, a pharmaceuticals domain, or any other suitable domain or industry.

In some embodiments, the ontology may comprise two types of attributes arranged strictly or loosely in a hierarchy: organic attributes and derived attributes. Organic attributes may comprise attributes of an entity which occur by the very nature of the existence of the entity, person, or structure within a domain. For example, attributes of a Healthcare provider entity stored in the document database 20 may include specialty, zip code, state, phone number, e-mail address, credentials, or other similar attributes. Organic attributes are not calculated, but instead exist without external intervention. Derived attributes may comprise attributes of an entity which are derived from organic attributes and/or other derived ontology attributes. Derived attributes may be calculated. For example, derived attributes of a Healthcare Provider entity may include experience, number or emergency room visits, influence, leadership, or other similar derived attributes.

In some embodiments, the ontology may comprise a provider-defined ontology. The provider-defined ontology may comprise a plurality of terms generated by the provider of the data management system 2 to describe a specific domain. For example, in one embodiment, the selected domain may comprise healthcare. The provider-defined ontology may comprise a plurality of terms describing the structures, concepts, and entities that exist within the healthcare domain. The provider-defined ontology may be maintained by a provider and may be provided to each instance of the data management system 2. The provider-defined ontology may be updated when entities are added to the document database 20 that are not described by the existing vocabulary. In some embodiments, the provider-defined ontology may be updated to include new terms to describe an entity added to the document database 20. In some embodiments, existing terms within the provider-defined ontology may be altered to encompass a new entity added to the document database 20.

In some embodiments, the ontology may comprise user-defined ontology comprising a plurality of user-defined terms. The user-defined terms may be provided by a user and may comprise vocabulary not included in the provider-defined ontology or may overlap with the vocabulary of the provider-defined ontology. The user-defined ontology may comprise vocabulary specific to the user or the user data. The user-defined ontology may replace the provider-defined ontology within the system, may be maintained separate from the provider-defined ontology, or may be merged with the provider-defined ontology.

In some embodiments, the ontology may comprise a merged ontology. A provider-defined ontology may be provided by a provider and may comprise vocabulary defining common or generic terms within a domain. A user-defined ontology may be provided by a user and may comprise additional vocabulary defining common, uncommon, or user-specific terms within the domain. The merged ontology may comprise a combined ontology of the provider-defined ontology and the user-defined ontology.

For example, a user may access a data management system 2 configured for a pharmaceutical domain. The user may want to incorporate Healthcare Provider survey results, such as, for example, attitudinal Likert scale survey results, as attributes of entities represented within the document database. Each survey response may be assigned as an organic attribute of a given healthcare provider represented within the document database 20. For example, the healthcare provider's response to a specific question may represent the healthcare provider's attitude toward genetic pre-screening. The user may also want to incorporate both the strength of the attitude (distance from the center of the Likert scale) and the direction of the attitude (positive or negative) into the calculation of a provider-defined, derived ontology attribute (or term) such as the Key Opinion Leader (KOL) attribute. The data management system 2 may generate one or more user-defined organic ontological attributes for the survey results and two new derived ontological attributes for the strength of attitude (distance from center) and direction of attitude attributes (organic and derived attributes are discussed in more detail below). In one embodiment, the provider-defined ontology may be modified to incorporate the new organic and derived attributes. The data management system 2 may allow incorporation of the user data and user-defined ontological attributes without any foreknowledge of the survey, the meaning of individual questions or how the data is represented.

In some embodiments, the user-defined ontology may comprise one or more terms that conflict with the vocabulary of the provider-defined ontology. Conflicting terms may comprise, for example, a first term in the provider-defined ontology and a second term in the user-defined ontology for describing the same attribute of an entity, a term in the provider-defined ontology to describe a first feature of an entity and the same term in the user-defined ontology to describe a second feature of an entity, or a term in the provider-defined ontology having a first set of ontological relationships and the same term in the user-defined ontology having a second set of ontological relationships. In some embodiments, conflicting terms are resolved by taking the ontological properties of the user-defined ontology for the merged ontology.

Figure 2:
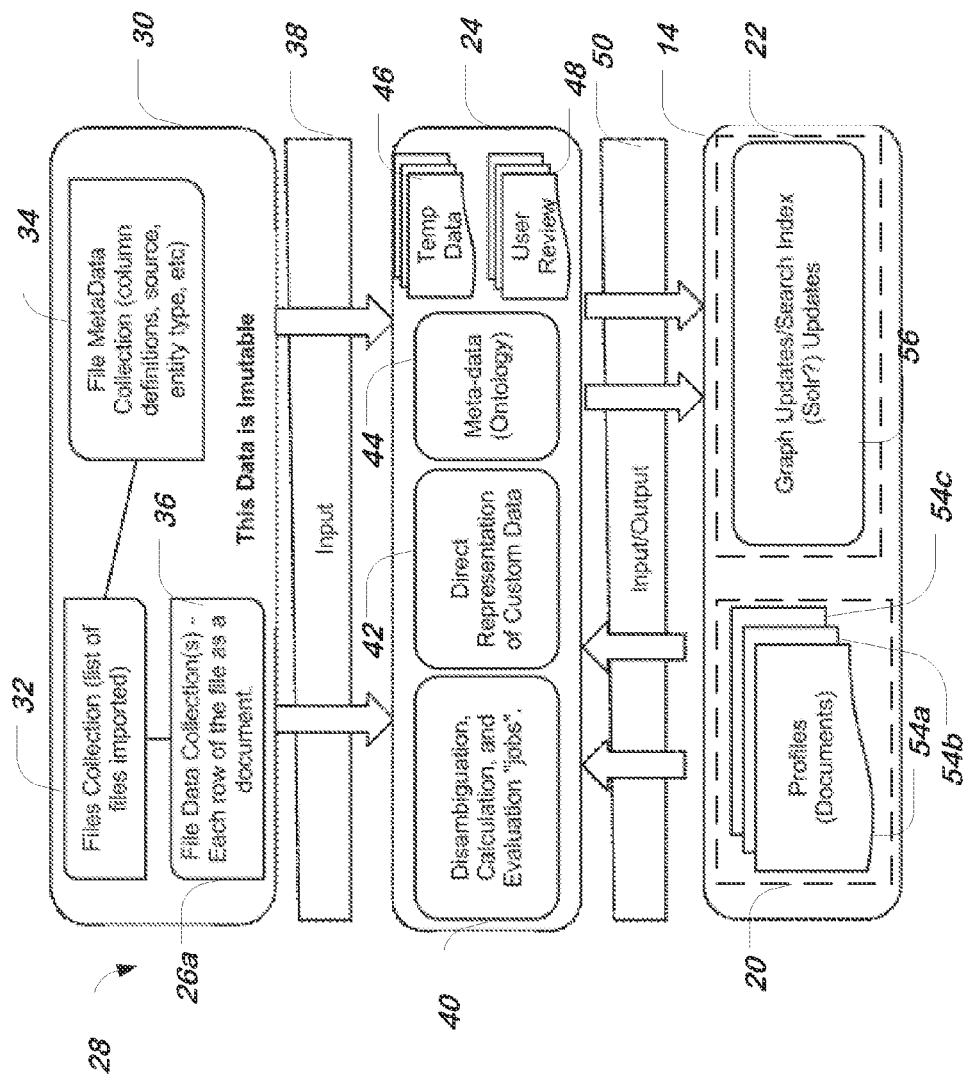
FIG. 2 illustrates one embodiment of a data management process.

FIG. 2 illustrates one embodiment of a data management process 28 for ingesting, organizing, and accessing data within the data management system 2. The data management process 28 has an initial state 30 comprising a data import, such as a data import of user data. The initial state 30 comprises file collection 32, file meta-data collection 34, and file data collection 34. File collection 32 may comprise generating a list of each file imported. The file meta-data collection 34 may comprise obtaining the vocabulary describing the imported files. For example, the file meta-data collection 34 may determine column definitions for the imported file, the source entity type for the imported file, or any other relevant vocabulary for the imported file. The file data collection 36 process may establish each row of a file as a document for storage in the document database 20.

The bulk data from the data import 30 may be input 38 into the data management component 24. The data management component 24 may be configured to provide processing, evaluation, and disambiguation of the imported data 40. The data management component 24 may also be configured to calculate one or more derived attributes of the imported data 40. The data management component 24 may provide a direct representation of custom data 42 provided by a user. The data management component 24 manages the ontology 44 of the data management system 2. The data management component 24 may establish node and graph connections for the imported data based on the ontology, as expressed in the meta-data, of the imported data. The data management component 24 may be configured to extend or modify the ontology of the data management system 2 to include the vocabulary identified for the imported data. The data management component 24 may store temporary data 46 during processing. The data management component 24 may allow user review 48 of the selected ontological terms, node connections, and parsing of the imported data. The data management system 24 may have input and output access 50 to the two-tiered database architecture 14. The data management system 24 may access data 54a-54c stored in the document database 20 and may access the graph connections and search indexes 56 of the graph database 22.

Figure 3:
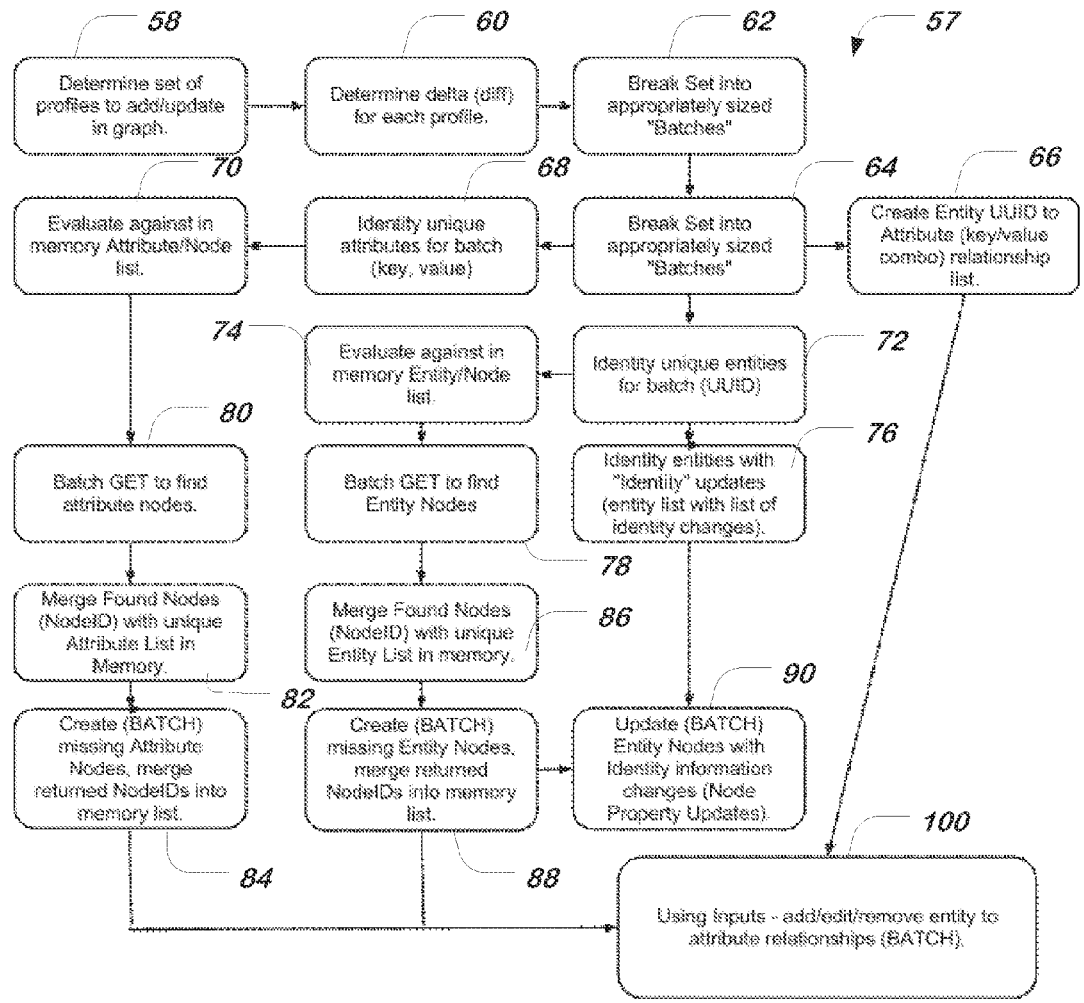
FIG. 3 illustrates one embodiment of a document database and graph database synchronization process.

FIG. 3 illustrates one embodiment of a graph database/document database synchronization process 57. The synchronization process 57 comprises the initial step of determining the set of profiles 58 (graph connections, vocabulary, etc) that need to be updated based on the data import process of FIG. 2. The synchronization process 57 determines the difference 50 (or delta) between the stored versions of the identified profiles and the updated versions of the identified profiles. The synchronization process 57 breaks 62, 64 the profile updates into smaller batch updates for updating the graph database 22. If the batch comprises a single entity not represented in the graph database 22, the synchronization process 57 creates 66 an entity universally unique identifier (UUID) and generates an attribute relationship list between the entity UUID and the attributes (such as organic or derived attributes) identified for the new entity. The entity is added 100 to the attribute relationships stored in the document database 20 and expressed in the graph database 22.

In some embodiments, the synchronization process 57 may receive a batch comprising updates to existing entities. The synchronization process 57 may identify 72 the UUIDs for the existing entities. If the UUID of the entity itself has been updated, such as, for example, if the name of the entity has changed due to a merger or rebranding, the synchronization process 57 identifies 76 the entities with identify updates and prepares 90 a batch update for the entity nodes comprising the identity information changes and updates the graph database 22 nodes.

In some embodiments, the synchronization process 57 may evaluate 44 updates to entities to identify attribute changes for entities already comprising at least one node in the graph database 22. The synchronization process 57 may run 78 a batch "GET" to find the entity nodes corresponding to the evaluated entities. The synchronization process 57 merges 86 the found nodes with the entity updates stored in memory. If the evaluation 44 fails to identify a node in the graph database 22 corresponding to the updated entity, the synchronization process 57 may generate 88 a batch of missing entity nodes and may merge the missing entity nodes into the graph database 22. In some embodiments, the synchronization process 57 may identify one or more changes to unique attributes of the graph database 22. The synchronization process 57 evaluates 70 the list of changed or added attributes with the attribute nodes within the graph database 22. The synchronization process 57 retrieves 80 the identified attribute nodes and updates the attribute nodes with the updated attribute list. If an attribute node is not identified during the evaluation 70, the synchronization process generates new nodes for the missing attributes and adds 100 the missing nodes to the graph database 22.

Figure 4:
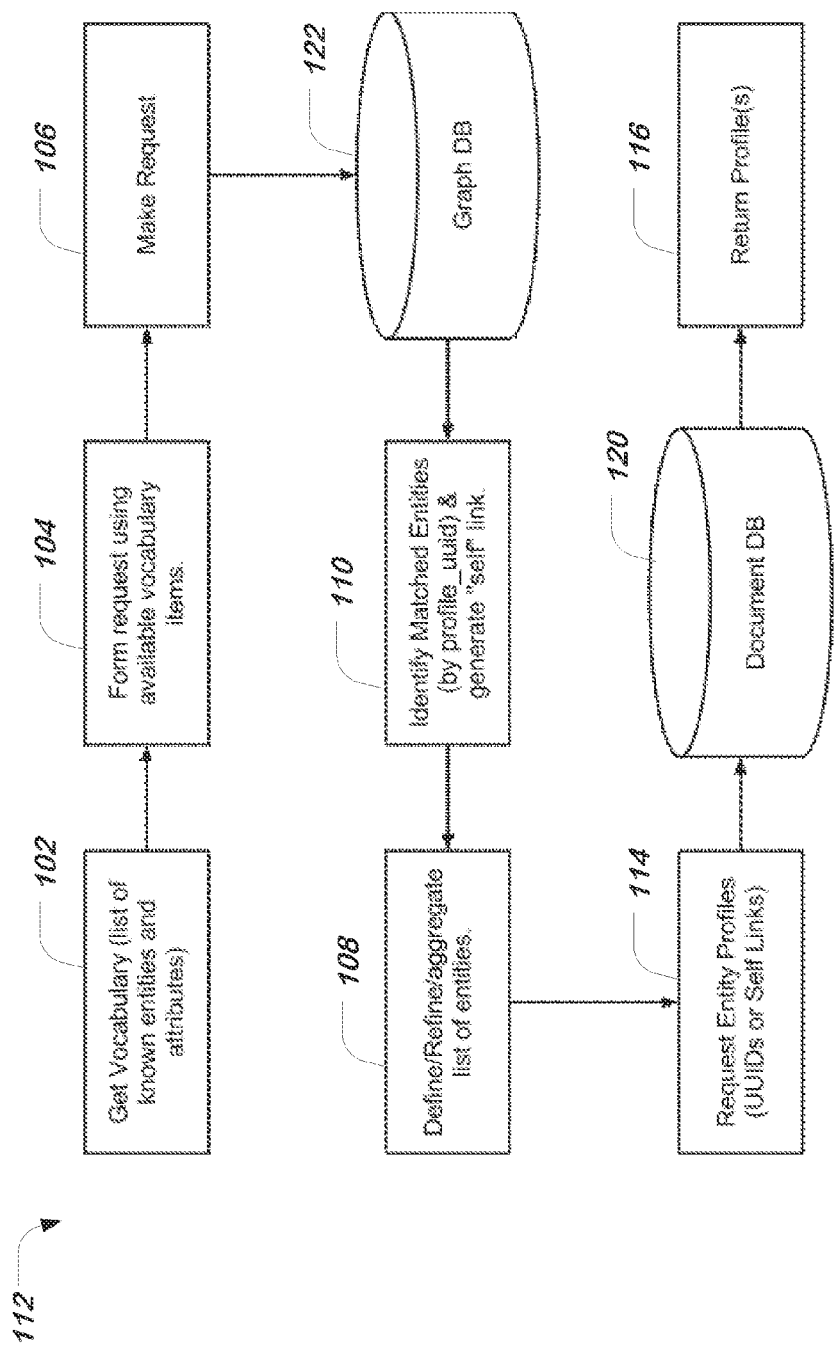
FIG. 4 illustrates one embodiment of a data accessibility process through an application programming interface.

FIG. 4 illustrates one embodiment of a data accessibility API 112. The API 112 may retrieve 102 the vocabulary for the data management system 2. A request, such as, for example, a search request, may be generated 104 using the vocabulary of the data management system 2. The request is made 106 to the graph database 122. The graph database implements the request, such as, for example, through a search index and identifies 108 entities or attributes that match the request. The identified entities may be further refined 110 to generate an aggregate list of entities corresponding to the use request. The API 12 generates a request 114 for the entity profiles from the document database 120 based on the shared node IDs identified by the graph database 122. The document database 120 may return 116 the entities, profiles, or documents matching the request.

In one embodiment, the data management system 2 may serve at least two primary abstract purposes: (1) the retention of fully canonical representation of entities within a domain, such as, for example, entities within a healthcare domain such as Healthcare professionals (HCPs), Key Opinion Leaders (KOLs), Institutions, or other entities within the healthcare domain; and (2) the modeling of the relationships between entities, between entities and various entity attributes and enabling the traversal of those relationships for discovery. For example, in some embodiments, entities within a healthcare domain may comprise attributes including specialty, practice area, accreditations, or other healthcare specific attributes. The attributes of the entities may correspond to at least a portion of the terms within ontology vocabulary. By combining the first and second abstract purposes, the data management system 2 may provide insight into the modeled domain. In some embodiments, the data management system 2 may retain previous representations of entities such as historical information useful in disambiguation, meta-data about various attributes, as well as the metadata that is implemented within the [ ] (CDAL) and data management process 24 (DMP) to derive the fully canonical representations of entities and the relationships between those entities and their attributes.

In some embodiments, the data management system 2 implements a two-tiered architecture 14, comprising a document database 20 and a graph database 22 persistence platform, to leverage the variable schema and atomic nature of a document as an implementer of the canonical entity representation and the node/edge relational structure to implement relationships between entities and between entities and their attributes. A single persistence solution that enables both primary purposes of the platform, such as for example, implementing only the document database 20 or only the graph database 22, would require significant tradeoffs and create complexity in the management of data and the abstraction of components required to implement core functionality. A document database 20 may be well suited to storing an atomic (self-contained), canonical representation of an entity. However, the document database 20 may be incapable of effectively managing a complex structure of pair-wise relations between entities and relevant entity attributes, which may be useful in the browsing of target market data. Relational databases excel at managing relations between sets of aggregated data (one to many relationships), however, when attempting to manage relations between disaggregated data (nodes), such as the data stored in the document database, relational models generally require creating a predetermined relationship map, or hierarchy, which may be brittle and exceptionally difficult to manage in an environment where relations are amorphous. The data management system 2 implements a flexible, schema-less, amorphous persistence solution. In some embodiments, the two-tiered architecture 14 is configured to defer as few problems as possible "up the stack" to higher-order architectures.

In one embodiment, the canonical entity and attribute representations (e.g., documents) are stored in the document database 20 and the relationship information is stored in the graph database 22. The graph database 22 may be intentionally data sparse such that the graph database 22 will carry only the representation information useful for discovery (browsing the graph). The graph database 22 may be heavily indexed to enable node searchability. The graph database 22 relationships may be meaningful in terms of both direction and in terms of naming. For example, the graph database 22 may comprise one or more directions connecting entities within the document database 20, such as attributes identifying that an entity "works at" another entity stored in the document database 20, "went to" an institution represented in the document database 20, or "has a" feature represented in the document database 20. As another example, the graph database 22 may comprise one or more significant attribute names, such as, for example, a primary address attribute, a practice address attribute, or other significant attribute identifiers. In some embodiments, the relationships between the nodes and entities may also be heavily indexed to promote searchability.

In one embodiment, the document database 20 may comprise one or more representation of entities. Entities may refer to people, places and things, such as, for example, people, institutions, or practice areas within a specific domain. For example, the document database 20 for a healthcare domain may comprise entities such as, for example, healthcare providers, healthcare institutions, universities, research institutions, and any other physical real-world object. In some embodiments, entities may also comprise products, such as, for example, industry or customer products.

In some embodiments, the entities within the document database 20 may comprise attributes which may identify information about the entities. In some embodiments, attributes may have no tangible meaning in the document database 20 or graph database 22 without being associated with an entity. For example, in some embodiments, attributes of an entity may include addresses, specialties, accreditations, authorship, survey data, or geographic location to name just a few. In some embodiments, the data management system 2 may provide standards and practices around the definition of entities and attributes. In some embodiments, the assignment as an attribute or an entity may be arbitrary. The data management system 2 may differentiate entities from attributes based on the information provided at creation. By providing flexibility between the assignment of data as attributes or entities, the data management system 2 provides an adaptive system for organizing and accessing data.

Figure 5:
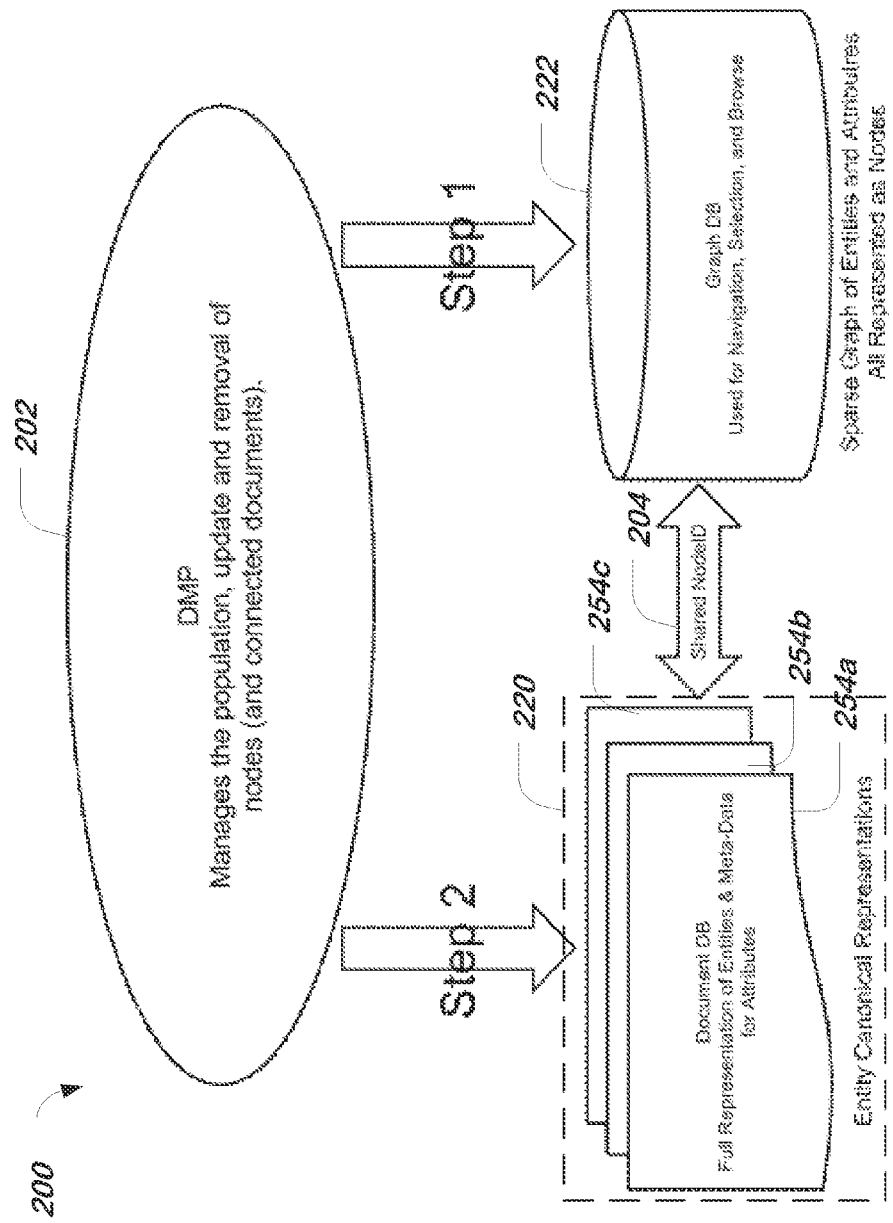
FIG. 5 illustrates one embodiment of a process for accessing a graph database and a document database.

FIG. 5 illustrates one embodiment of a persistence architecture 200. The persistence architecture 200 may comprise a combined core persistence (e.g., a two-tiered architecture 14) comprising a document database 220 and a graph database 222. The document management platform (DMP) 202 may integrate with the document database 220 and the graph database 222 directly via native APIs. By accessing the document database 220 and the graph database 222 through one or more native APIS, the persistence architecture 200 enables the greatest degree of flexibility in DMP 202 implementation and enables the DMP 202 to implement any feature as needed without requiring modification of the document database 220 or graph database 222 architectures.

As shown in FIG. 5, in order to access the document database 220, the DMP 202 first accesses the graph database 222 to navigate, select, or browse the data stored in the document database 220. The document database 220 and the graph database 222 comprise shared node IDs 204. The shared node ID 204 is used by the DMP 202 to access the documents 254a-254c identified by the graph database 222 and stored within the document database 220.

The graph database 222 provides an extensive and robust capability for the creation of expressive and non-hierarchical representations of user data. In some embodiments, it may be advantageous to provide fixed and potentially hierarchical ontologies for example, based on industry, specialty, department, or other attributes of the domain. The fixed ontologies may require a more fixed hierarchical structure for maintaining the relationships between the vocabulary of the various attributes. In some embodiments, the graph database 222 provides an expressive view into the ontology allowing a user to select an ontological root based on the user's understanding of the problem to be solved. For example, in some embodiments, the graph database 222 may allow a user to search for or select a specific term from the vocabulary and navigate through the ontology based on parent-child relationships between the selected term and the remainder of the vocabulary.

The ontology may be composed of hierarchical components. In some embodiments, the graph database 222 may only represent the implementation of the ontology, for example how the ontology is expressed as attributes assigned to entities. The definition of the ontology may be expressed as one or more documents stored in the document database 220. By storing the definition of the ontology in the document database 220, the data management system 2 may provide a rich hierarchical, definitional view of the ontology via the document structure while maintaining the expressiveness and composability of discovery inherent in the graph.

In one embodiment, the data management system 2 may comprise a provider-defined and industry specific ontology. The provider-defined ontology may comprise one or more sub-ontologies designed to tailor to specific functions or departments within a domain. In some embodiments, sub-ontologies may be assigned to certain entities or groups of entities based on their role within an organization, other entity, or ontological hierarchy. In some embodiments, the provider-defined ontologies may be defined within the document database 20 by relevant meta-data. The meta-data may define, for example: hierarchy and interdependencies of the entity; semantic characteristics of the entity; sub-components of the entity, expected content and types of content associated with the entity; or validation or verification mechanisms used by the entity. In some embodiments, derived attributes may extend the meta-data by providing additional information about attributes, such as, for example: a calculation mechanism such as algorithms, processing jobs, map-reduce functions, or other suitable calculation mechanisms; calculation frequency; input data required for the calculation; expected output data of the calculation, or other features of the meta-data defined attribute.

In some embodiments, the ontology may be extended and modified by a user-defined ontology. The user-defined ontology may extend or modify the implementation details of the provider-defined ontology (and sub-ontologies) to suit the particular needs of a user. The user-defined ontology may be stored discretely from the provider-defined ontology in the document database 20. In one embodiment, the user-defined ontology may comprise a copy of the provider-defined ontology with additional organic and derived attributes and/or modification to some of the provider-defined terms, such as, for example, modification of the system provided derived attributes. The user-defined ontology definitions may be stored in the document database 20 and may be modified and extended copies of the provider-defined ontology described above.

Figure 6:
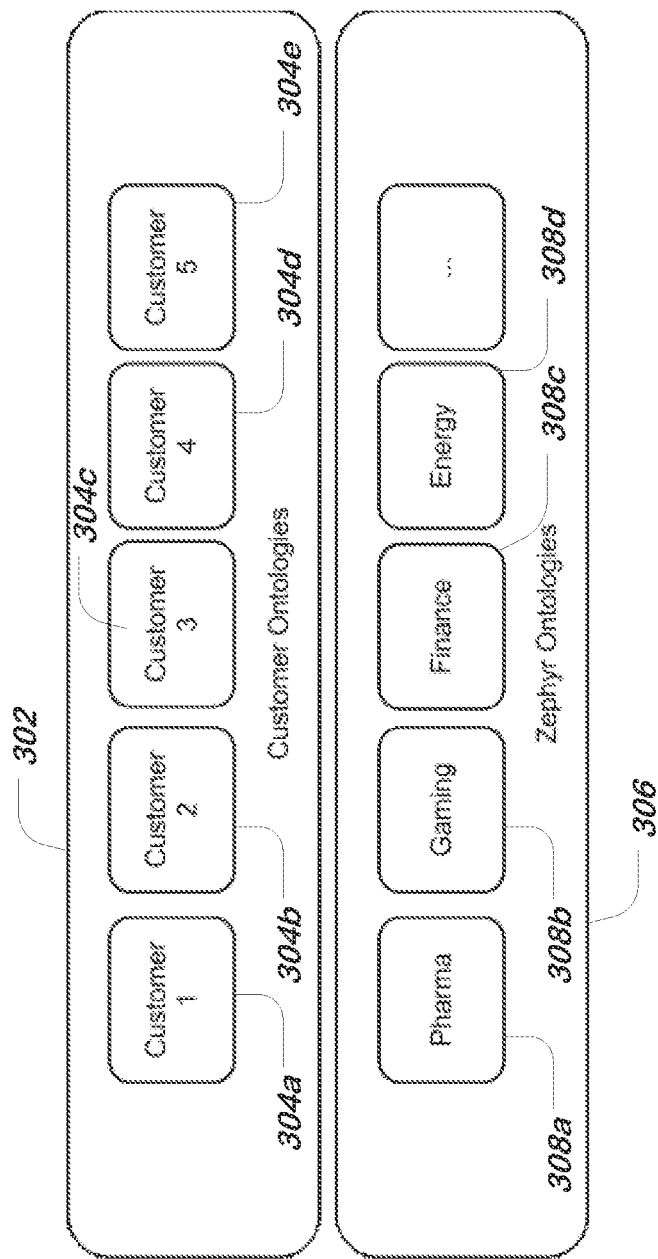
FIG. 6 illustrates one embodiment of provider-defined and user-defined ontologies.

FIG. 6 illustrates user-defined ontologies 302 and provider-defined ontologies 304. The user-defined ontologies 302 correspond to individual users 304a-304e of the data management system 2. Each user 304a-304e may have a user-defined ontology 302 associated with the user's embodiment of the data management system 2. In some embodiments, the data management system 2 may comprise multiple provider-defined ontologies 304. The provider-defined ontologies 304 may correspond to various domains, such as, for example a pharmaceutical domain 308a, a gaming domain 308b, a finance domain 308c, an energy domain 308d, or any other suitable domains.

In some embodiments, the data management system 2 may be configured to operate in a cloud based, Infrastructure-as-a-Service (IaaS), Software-as-a-Service (SaaS), multi-tenant environment. The data management system 2 may be configured to protect user proprietary data (such as the user-defined ontology and user-uploaded data) and share public data (such as the provider-defined ontology or provider data for a specific domain). In some embodiments, the data management system 2 actively manages data persistence and visibility through a combination of logical and physical separation.

In some embodiments, the data stored by the data management system 2 may comprise three distinct types of data: user-proprietary data, provider-proprietary data, and public record data. User-proprietary data may comprise data provided by a specific user or customer of the data management system 2. User-proprietary data may be managed by the specific user. The user-proprietary data may be protected user data and may not be accessed by other users. In some embodiments, user-proprietary data may comprise data derived (calculated) from other user-proprietary data. Provider-proprietary data may comprise provider data which is derived from public records data or generated by the data management system 2 via other means, such as, for example, purchase of data from vendors, surveys of the relevant domain, or other data collection techniques. Public record data may comprise data sourced from publicly available repositories. For example, in one embodiment involving a healthcare domain, public record data may be provided by AMA, SunlightOrg, PubMed, or other publicly available repositories. Those skilled in the art will appreciate that the publicly available repositories will vary from domain to domain.

In various embodiments, the data management system 2 may maintain data security through logical separation, physical separation, or both. Logical separation may comprise the sequestration of data at an access layer. In some embodiments, user-proprietary data for multiple users may be physically intermingled on the storage device by access to the user-proprietary data may b logically restricted to the specific user associated with the user-proprietary data. For example, the data stored by the data management system 2 for a specific user may reside on the same host as data stored for other users, may be stored on the same physical storage device, and may be intermingled on that storage device. For example, a first user's data may be held on the same server or in the same document database replica set as a second user's data. The first user's data may be logically separated into different document databases 20 stored by the server which would have distinct access restrictions, such as, for example user name and password requirements. Although the data is logically separated, the first user's data and the second user's data may reside on the same host and may reside on the same storage device within the host.

In some embodiments, the data management system 2 may maintain data security through physical separation. Physical separation may comprise the sequestration of data at the storage layer. Data may be stored on separate physical hosts and separate storage devices. By storing a user's data on separate physical hosts and separate storage devices, the data management system 2 may provide a greater level of security for user proprietary data. For example, a first user's data may be stored on a document database replica set comprising a first host, a second host, and a third host. In some embodiments, only the first user has access to the first host, the second host, and the third host. A second user's data may be stored on a document database replica set made up of a fourth host, a fifth host, and a sixth host and only the second user may have access to the fourth host, the fifth host, and the sixth host.

In some embodiments, user data may be segmented at the logical layer and the physical layer. By separating the data at both the logical layer and the physical layer, the data management system 2 may ensure data privacy across multiple users in a single domain or across multiple domains. In some embodiments, a first user and a second user may be competing within the domain and exposing user proprietary data may result in serious consequences for the users and the system providers. By ensuring data security through logical and physical separation, the data management system 2 may minimize the risks of accidental exposure of user proprietary data.

Figure 7:
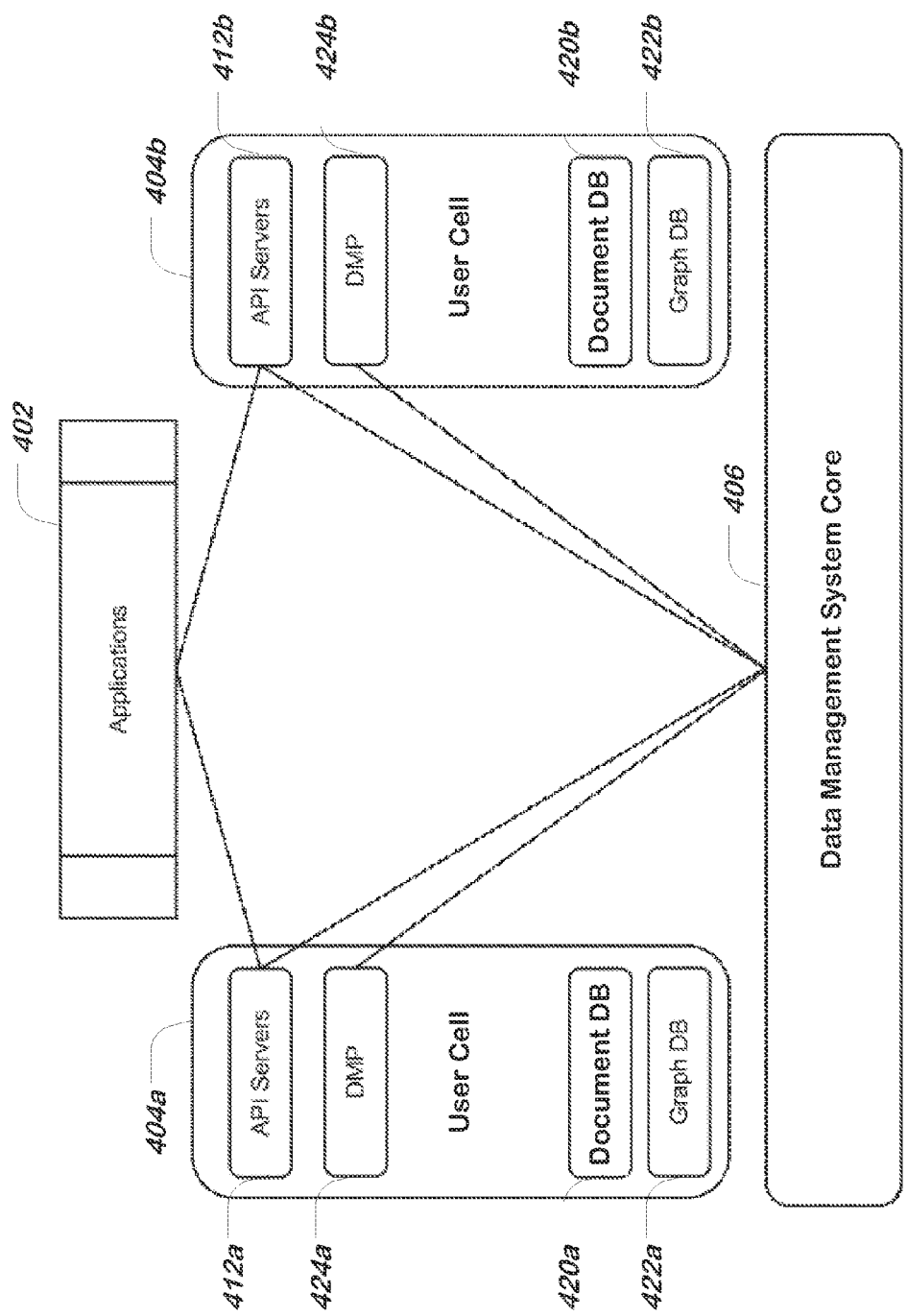
FIG. 7 illustrates one embodiment of a cell structure for implementing multiple instances of the data management system.

In some embodiments, the data management system 2 may maintain each user as a cell. FIG. 7 illustrates one embodiment of a cell architecture 400. The cell architecture 400 may comprise component isolation within the data management system 2. A cell 404a, 404b may comprise a self-contained installation of components capable of providing all operations of the data management system 2. For example, in the illustrated embodiment, the first cell 404a and the second cell 404b comprise individual version of the API servers 412a, 412b, the data management platform 424a, 424b, the document database 420a, 420b and the graph database 422a, 422b. In some embodiments, each cell 404a, 404b may be configured to service a single user. In some embodiments, each cell 404a, 404b may service a shard. A shard may comprise a plurality of users. For example, the data management system may comprise multiple shards, wherein each shard comprises only a single user from any given domain. For example, a shard may comprise a user within a healthcare domain, a user within a pharmaceutical domain, and a user within a chemical domain. By establishing each user as a cell 404a, 404b within the cell architecture 400, the data management system 2 may maintain the user's proprietary data in a secure environment. In some embodiments, each cell 404a, 404b may operate independently and may be coordinated by a programmable orchestration layer, such as, for example, the application API 412a, 412b, the DMP 424a, 424b and the meta-data which provides synchronization of the API 412a, 412b and the DMP 424a, 424b. In some embodiments, each cell 404a, 404b may comprise a full set of API servers 412a, DMP servers 424a, graph database 422 hosts and a document database 420 replica set. In some embodiments, the cell 404a, 404b may support multiple clients via client sharding of the graph database 20 and logical separation of document database 22 access.

In some embodiments, provider-proprietary data (such as the provider-defined ontology or provider-defined entities) and public record data, may be used to supplement or augment user-proprietary data. The provider-proprietary data and the public record data sets may become accessible to a specific cell 404a, 404b as the DMP 424a, 424b populates. The DMP 424a, 424b may use provider-proprietary data or public record data to create entities and attributes, organic or derived, in the user cell 404a, 404b. In some embodiments, the data management system 2 may control access to the provider-proprietary data and public record data internally. Users may have access to copies of the provider-proprietary data and public record data within the user's cell 404a, 404b. In some embodiments, the provider-proprietary data and/or the public record data may comprise one or more shards corresponding to specific domains. For example, the provider-proprietary data may comprise multiple shards separated by industry domain, or industry/function groups.

In some embodiments, a specified API 412a, 412b or DMP 424a, 424b node may be restricted to accessing a single set of user-proprietary data but may have access to the full set of provider-proprietary data and public sourced data. In some embodiments, the data, vocabulary, attributes, and entities of the provider-proprietary data and public sourced data may be stored in a document database 20 internally and exposed into the user specific document database 420a/graph database 422a of the user cell 402a. In some embodiments, an internal use graph may be generated for each individual cell implementation of the data management system 2.

In some embodiments, the cell architecture 400 may provide scaling by domain sharing (each user is a cell or shard) and logical and physical separation of each user's data for security purposes. The DMP 424a, 424b and API 412a, 412b implementations may be identical between cells 404a, 404b and may be driven by client and/or shared metadata. In some embodiments, each DMP 424a, 424b and API 412a, 412b implementation may be bound to a cell 404a and logically and physically incapable of connecting to another cell's 404b document database 420b or graph database 422b. Each cell 404a may comprise a representation of the provider-proprietary data and the public sourced data. In some embodiments, a fully canonical representation of the provider-proprietary data and the public sourced data may reside in the data management system core 406. If a user ceases to use the provider-proprietary data set or the public sourced data set, the graph database 422a, 422b nodes (entities and attributes) which were created within the user's cell 404a, 404b from the data management system core 406 may be deleted, including derived attributes which are a part of that data set.

Figure 8:
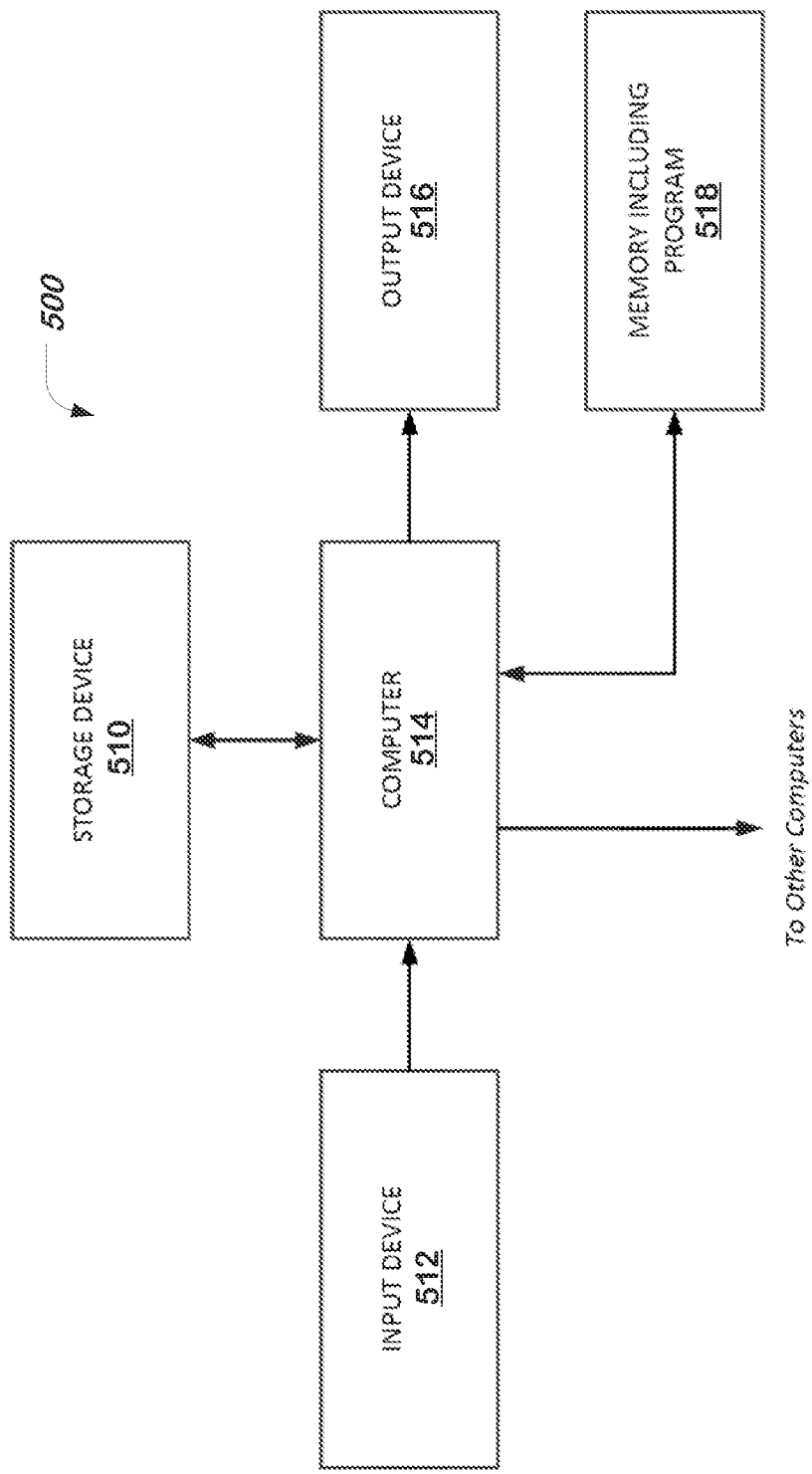
FIG. 8 illustrates one embodiment of a computing device which can be used in one embodiment of the system and method for storing multi-structured data.

FIG. 8 illustrates a computer system 500 for implementing a database architecture for storing multi-structured data according to various embodiments. By way of the following prophetic teaching, there is provided computer support, as in a data processing system, for implementing a data management system 2. The computer support for the computer-implemented method of the database architecture for storing multi-structured data may be implemented by a computer system 500 as shown FIG. 5, or it may be implemented by multiple computers that may be connected or networked together in an ongoing manner, intermittently, or one time. In any case, control of such system can be enabled in accordance herein discussed below. The computer system 500 may include a computer 514, an input device 512 such as a keyboard, a storage device 510 such as a memory, a memory 518 including a program, such as a disk (note the storage 510 and memory 518 may or may not be the same device, depending on the implementation desired, in one embodiment the storage device 510 is a non-transitory storage device) including software, and an output device 515 such as a monitor screen, computer-to-computer communication device (e.g., modem), and/or a printer.

In one embodiment herein, a non-transitory computer-readable media or memory 518 is provided. The computer-readable media or memory 518 tangibly embodies a program of instructions executable by the computer system to store a document database in a memory unit, wherein the document database is configured to store data without any foreknowledge of a structure of the data, wherein the data comprises an ontology comprising a plurality of terms describing the data; and store a graph database in the memory unit, wherein the graph database comprises a materialized view of the document database, wherein the graph database provides connections between the ontology, and wherein the document database and the graph database share common entity profile UUIDs. Further, the computer-readable media or memory 518 tangibly embodies a program of instructions executable by the computer system to store a document database in a memory unit, wherein the document database is configured to query the graph database based on at least one user provided term, wherein the user provided term matches at least one term of the ontology, and wherein the graph database returns the node IDs corresponding to at least one node matching the at least one user provided term; and retrieve at least one document from the document database, wherein the at least one documents comprises the node IDs returned by the graph database. Indeed the program instructions can be such as to carry out any computer-assisted method or operation discussed herein.

In one embodiment, the computer support may include a process for controlling a computer system that implements the database architecture for storing multi-structured data. The system for controlling a computer system may include a switching system, which at a simplest level, can be menu displayed on a computer screen. The system for controlling may be structured to offer choices to solicit predetermined data or trigger predetermined operations, including, for example: entering data associated with the database architecture computer system.

In one embodiment, a plurality of computers can cooperate to implement the tax savings techniques for healthcare plans. For example, each computer system can utilize a computer-to-computer communication device, and such as a network (e.g., telephone, Internet, cable, etc.) with electronic transmission means for (e.g., email, real time communication system, or the like), e.g., with a corresponding receiver system, in communicating between the computers to enable the computers to cooperate in carrying out the implementing of computer-implemented tax savings techniques for healthcare plans.

For example, the plurality of computers may implement a computer-implemented system configured to execute a program of instructions executable by the computer system to store, by a memory unit, a document database configured to store data without any foreknowledge of a structure of the data, wherein the data comprises an ontology comprising a plurality of terms describing the data; store, by a memory unit, a graph database comprising a materialized view of the document database, wherein the graph database provides connections between the plurality of terms, and wherein the document database and the graph database share common entity profile UUIDs; access, by the processor, data in the document database through the connections of the graph database.

If implemented by more than one computer, the computer system 500 may include at least a provider of goods or services computer system. Any or all of the computer systems may include one or all of the following: an input device 512, such as a keyboard; a storage device 510; an output device 515; a memory 518, including a program, the foregoing articulated in greater exemplification with regard to FIG. 5, e.g., with the storage device 510 and memory 518 being separate or the same, as one may prefer in one implementation or another.

While various details have been set forth in the foregoing description, it will be appreciated that the various aspects of the record linkage process may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for implementing computer-implemented record linkage process, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A data management system for ingesting, organizing, and storing data, the data management system comprising:
    a processor;
    a memory unit; and
    a two-tiered database architecture, comprising:
        a document database stored by the memory unit, wherein the document database is configured to store data without any foreknowledge of a structure of the data, wherein the data comprises an ontology comprising a plurality of terms describing the data within the document database; and
        a graph database stored by the memory unit, wherein the graph database is configured to index and query underlying data stored in the document database, wherein the graph database comprises a materialized view of the document database to facilitate navigation of the ontology in the document database, wherein the graph database provides connections between the ontology, and wherein the document database and the graph database share common entity profile universally unique identifier (UUID).

2. The data management system of claim 1, wherein the ontology comprises a provider-defined ontology, wherein the provider-defined ontology comprises a plurality of provider-defined terms describing the data within the document database.

3. The data management system of claim 2, wherein the ontology comprises a user-defined ontology, wherein the user-defined ontology comprises a plurality of user defined terms describing the data within the document database.

4. The data management system of claim 3, wherein the ontology comprises a merged ontology, wherein the merged ontology comprises the plurality of provider-defined terms and the plurality of user defined terms, and wherein, when a provider-defined term and a user defined term conflict, the merged ontology comprises the user defined term.

5. The data management system of claim 1, wherein the data stored in the document database comprises at least one organic attribute, wherein the at least one organic attribute comprises a feature of an entity represented by the data stored in the document database, and wherein the organic attribute is included in the ontology.

6. The data management system of claim 5, wherein the data stored in the document database comprises at least one derived attribute, wherein the at least one derived attribute comprises a calculated feature of the entity based on at least one organic attribute, and wherein the derived attribute is included in the ontology.

7. The data management system of claim 1, comprising an application programming interface (API) executed by the processor, wherein the API is configured to:
    query the graph database based on at least one user provided term, wherein the user provided term matches at least one term of the ontology, and wherein the graph database returns the node IDs corresponding to at least one node matching the at least one user provided term; and
    retrieve at least one document from the document database, wherein the at least one documents comprises the node IDs returned by the graph database.

8. The data management system of claim 1, wherein the document database and the graph database are stored in a cell-based architecture, wherein the document database and the graph database are isolated from additional data stored by the memory unit.

9. The data management system of claim 1, wherein the ontology comprises a hierarchical ontology, wherein the plurality of terms comprise at least one parent-child relationship.

10. A computer-implemented method for ingesting, organizing, and accessing data, the method comprising:
storing, by a memory unit, a two-tiered database architecture, comprising: a document database configured to store data without any foreknowledge of a structure of the data, wherein the data comprises an ontology comprising a plurality of terms describing the data;
storing, by a memory unit, a graph database wherein the graph database is configured to index and query underlying data stored in the document database, the graph database comprising a materialized view of the document database to facilitate navigation of the ontology in the document database, wherein the graph database provides connections between the plurality of terms, and wherein the document database and the graph database share common entity profile universally unique identifier (UUID);
accessing, by the processor, data in the document database through the connections of the graph database.

11. The computer-implemented method of claim 10, wherein the ontology comprises a provider-defined ontology, wherein the provider-defined ontology comprises a plurality of provider-defined terms describing the data within the document database.

12. The computer-implemented method of claim 11, wherein the ontology comprises a user-defined ontology, wherein the user-defined ontology comprises a plurality of user defined terms describing the data within the document database.

13. The computer-implemented method of claim 12, wherein the ontology comprises a merged ontology, wherein the merged ontology comprises the plurality of providerdefined terms and the plurality of user defined terms, and wherein, when a provider-defined term and a user defined term conflict, the merged ontology comprises the user defined term.

14. The computer-implemented method of claim 10, wherein the data stored in the document database comprises at least one organic attribute, wherein the at least one organic attribute comprises a feature of an entity represented by the data stored in the document database, and wherein the organic attribute is included in the ontology.

15. The computer-implemented method of claim 14, wherein the data stored in the document database comprises at least one derived attribute, wherein the at least one derived attribute comprises a calculated feature of the entity based on at least one organic attribute, and wherein the derived attribute is included in the ontology.

16. The computer-implemented method of claim 10, comprising:
querying, by an application programming interface, the graph database based on at least one user provided term, wherein the user provided term matches at least one term of the ontology, and wherein the graph database returns the node IDs corresponding to at least one node matching the at least one user provided term; and
retrieving, by the application programming interface, at least one document from the document database, wherein the at least one documents comprises the node IDs returned by the graph database.

17. The computer-implemented method of claim 10, comprising storing, by the memory unit, the document database and the graph database in a cell-based architecture, wherein the document database and the graph database are isolated from additional data stored by the memory unit.

18. The computer-implemented method of claim 10, wherein the ontology comprises a hierarchical ontology, and wherein the plurality of terms comprises at least one parent-child relationship.

19. A non-transitory computer-readable medium comprising a plurality of instructions which may be executed by a computer processor, wherein the plurality of instructions causes the processor to:
store a document database in a memory unit, a two-tiered database architecture, comprising: a document database configured to store data without any foreknowledge of a structure of the data, wherein the data comprises an ontology comprising a plurality of terms describing the data; and
store a graph database in the memory unit, wherein the graph database is configured to index and query underlying data stored in the document database, wherein the graph database comprises a materialized view of the document database to facilitate navigation of the ontology in the document database, wherein the graph database provides connections between the ontology, and wherein the document database and the graph database share common entity profile universally unique identifier (UUID).

20. The non-transitory computer-readable medium of claim 19, wherein the plurality of instructions further causes the processor to:
query the graph database based on at least one user provided term, wherein the user provided term matches at least one term of the ontology, and wherein the graph database returns the node IDs corresponding to at least one node matching the at least one user provided term; and
retrieve at least one document from the document database, wherein the at least one documents comprises the node IDs returned by the graph database.

* * * * *